April 20, 1948.   E. H. PIRON   2,439,906
WHEEL SPRINGING ELEMENT
Filed March 29, 1943   2 Sheets-Sheet 1

Inventor
EMIL H. PIRON,

By [signature]
Attorney

April 20, 1948.　　　　E. H. PIRON　　　　2,439,906
WHEEL SPRINGING ELEMENT
Filed March 29, 1943　　　2 Sheets-Sheet 2
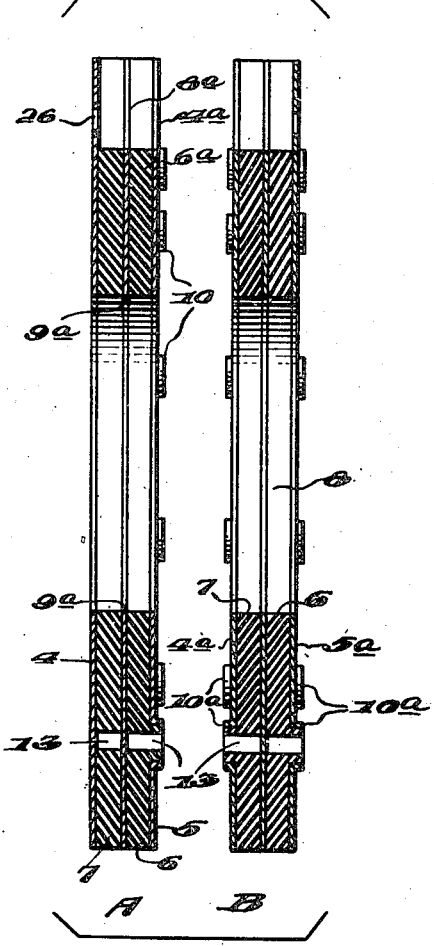
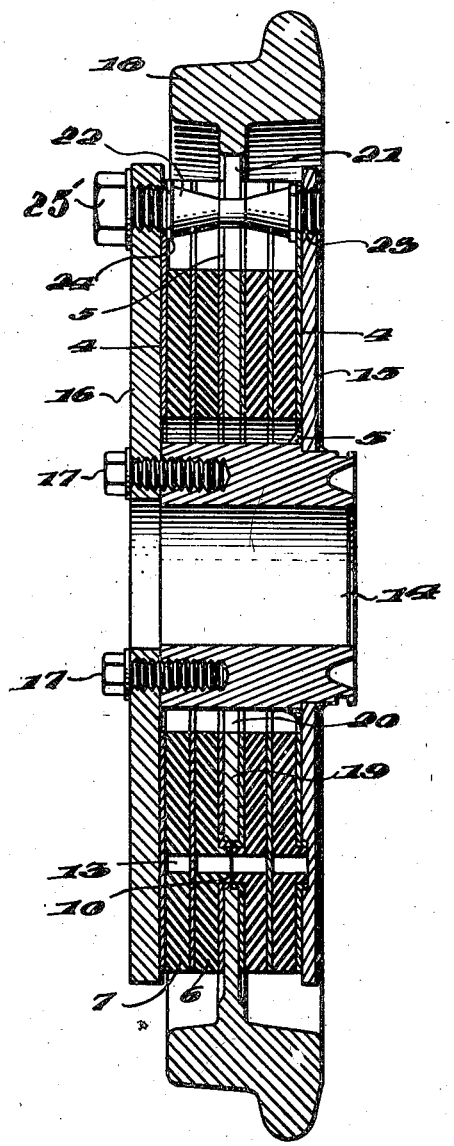
Inventor
EMIL H. PIRON,
By
Attorney Patented Apr. 20, 1948

2,439,906

UNITED STATES PATENT OFFICE 2,439,906

WHEEL SPRINGING ELEMENT

Emil H. Piron, New York, N. Y., assignor to Transit Research Corporation, New York, N. Y., a corporation of New York Application March 29, 1943, Serial No. 480,998

6 Claims. (Cl. 295—11)

This invention relates to springing elements for resilient wheels and has for its object to provide elements which will give substantial deflection under radial wheel loading and which will have prolonged life.

Many present day resilient wheels employ springing elements each comprising a comparatively thick toroid of rubber having metallic discs surface bonded to opposite faces thereof. If the peripheral surfaces of those toroids were cylindrical the rubber would bulge at their inner and outer edges under the pressures required by assembly, to such an extent that serious tension would be set up. In an attempt to obviate the cracking of the bulging edges which results from this condition the peripheries of the toroids are grooved on a curve such that when the pressure of assembly is imposed the peripheral edges assume a cylindrical shape. This solution has not proven entirely satisfactory with increasingly thicker rubbers as cracking still occurs along the edges due to the high local strains and stresses under high operating pressures with the result that while the life of the rubber was materially lengthened, it becomes increasingly desirable and, in fact, essential at this time that these rubbers be given greater life.

The principal object of this invention is to provide mating rubber springing elements which will have a deflection equal to that found satisfactory in the present day wheels and which are so constructed that the tendency to crack at the inner and outer periphery will be largely overcome.

A further object is to provide a method of making these improved elements, commonly known as "wheel sandwiches" by virtue of the rubber being sandwiched between two metallic plates.

In carrying my invention into effect I provide a mold capable of holding three metallic plates in spaced relation with rubber filling the spaces between the plates. The mold with its charge is then subjected to heating in order to vulcanize the rubber and to cause it to bond to the plates. The article is then removed, the center plate is ground or sheared to size as may be necessary and one springing element is ready for use. The term "rubber" will be understood to mean natural or synthetic rubber and also any synthetic material possessing rubber-like characteristics which render it suitable for use as a springing medium.

Figure 1:
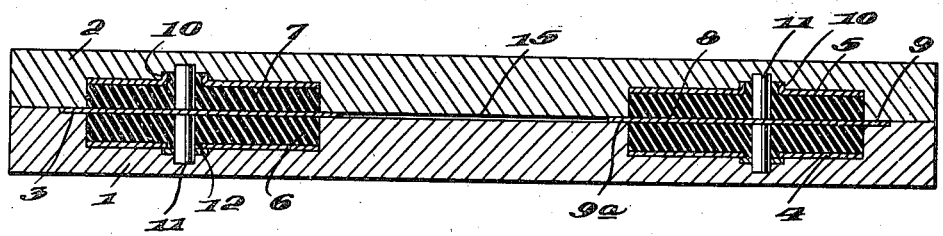
Figure 2:
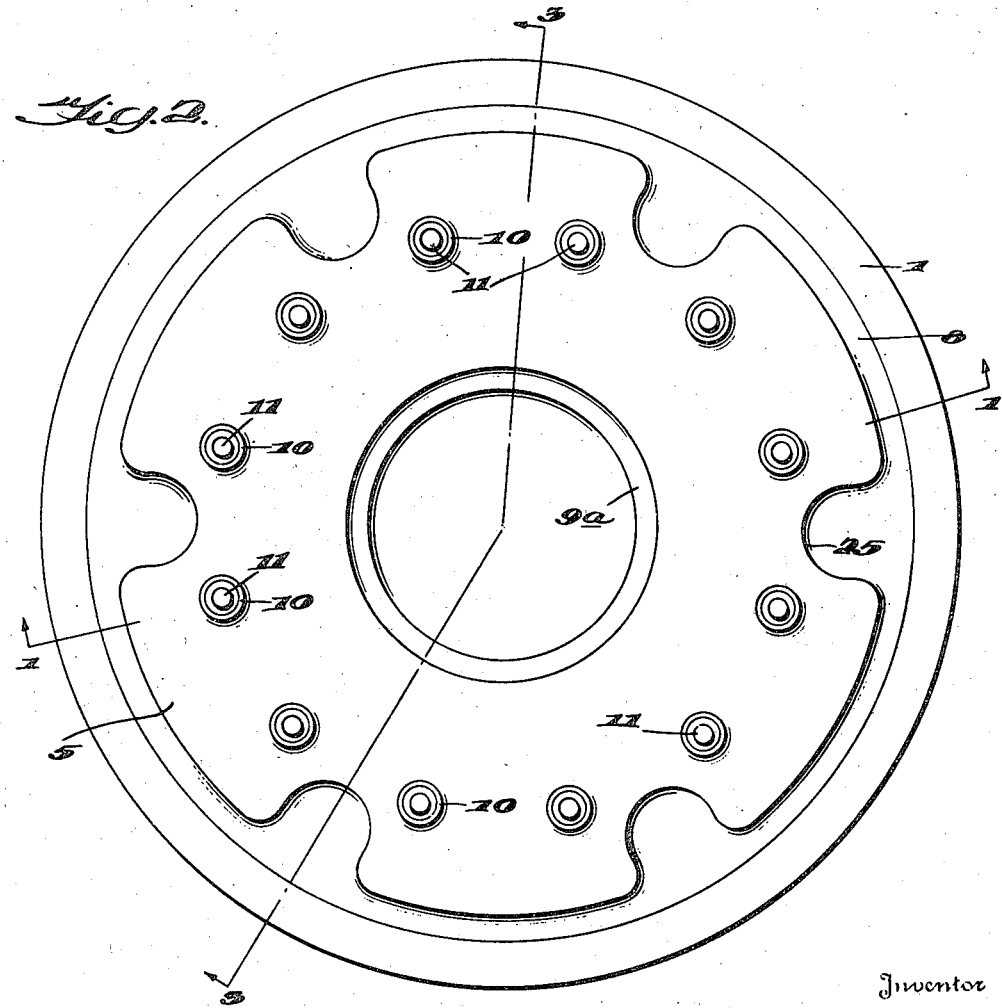

The invention will be better understood with reference to the accompanying drawings in which Fig. 1 is a diametric section through a mold loaded with rubber separating three metallic plates, of which the center plate is maintained in position by its edges which project outside of the edges of the two outer plates and by pins projecting from the mold, at both sides, through openings in the outer plates, ready for heating to form my improved wheel sandwich, taken along the line 1—1 of Fig. 2, Fig. 2 is a top plan view of the mold of Fig. 1 with the top of the mold removed to show an outside metallic plate and the periphery and vicinity of the central plate, Fig. 3 shows diametric views of the elements after removal from the mold, taken centrally through the scallops, along the line 3—3 of Figure 1, Figure 3A when dowels are provided at one side and Fig. 3B where dowels are provided at both sides, and Fig. 4 is a diametric section through a wheel employing my improved elements as shown in Fig. 3A and fully assembled.

More particularly, a mold is provided composed of two parts 1 and 2 each having a major cavity of the same size and shape, each cavity having the shape of a cylinder with scalloped sidewalls to conform to the shape of the disc 5 as shown in Fig. 2. The part 1 also has a secondary cavity portion 3 formed by removing a portion of the surface which contacts the other mold part 2. The bases of the cavities in the parts 1 and 2 receive metallic discs 4 and 5 respectively, in close fitting engagement therewith. An unvulcanized mass of rubber 6 is then placed against the disc 4, another unvulcanized mass of rubber 7 is placed against the disc 5, and a third disc 8 is placed over the mass 6. The mold part 2 with its charge is then closed on the part 1 with the mass 7 lying against the disc 8.

It will be noted that the two discs 4 and 5 have large central openings therethrough. The disc 8 has a central opening therethrough of less diameter than that of the other two discs and also smaller than the core of the mold. The outer periphery of the disc 8 is cylindrical and its diameter is greater than the greatest diameter of the discs 4 and 5, the outer peripheral portion 9 thereof occupying the secondary cavity 3 of the mold part 1 and its inner peripheral portion, 9a, part of the space between the cores of the mold. The portions 9 and 9a thus hold the disc 8 equally spaced between the bottoms of the large cavities in the mold parts 1 and 2. In addition, mold dowels 11 project from recesses in the bottom of each part 1 and 2 of the mold and extend through holes provided in the two outer plates 4 and 5, to the corresponding surface of the inner plate 8, thus helping to maintain the plate 8 in position.

After the mold is closed it is then subjected to heat for a sufficient time to vulcanize the rubbers 6 and 7 which bonds the rubber to the discs 4, 5 and 8, it being understood that these discs will have been brass plated or otherwise prepared so that good surface-bonding will take place.

The resultant product is then removed from the mold, the pins 11 removed and, if necessary, the disc 8 is ground or sheared to the proper size and shape. In preferred form the peripheries of the disc 8 are left as they come from the mold to avoid the expense and complications of trimming. The springing element thus formed is as illustrated in Fig. 3A. This figure and Figure 2 also illustrate that hollow dowels 10 are provided in disc 5, these dowels being pressed from the disc prior to insertion in the mold. The dowels become partially filled with rubber as the mold is charged and as vulcanization proceeds, the pins 11 occupying the remaining space.

The mold part 1 has small cavities in its base equal in size and number to the small cavities in the base of the mold part 2 which receive the dowels 10 and the outer ends of the pins 11. However, the plates 4 are not provided with dowels corresponding to dowels 10 but with holes which are covered by small plates 12, the plates 12 each having a hole therethrough through which a dowel pin 11 extends. After removal of the pins 11 openings 13 remain.

Figure 3B shows a springing element made from the same mold in which the small plates 12 have been removed. Dowels 10a are formed on the plate 4a in the same manner as on the plate 5a, these being identical with the dowels 10 of plate 5. Pins 11 are used during vulcanizing and the resultant springing element is the same on both sides, as illustrated. It will also be noted that scallops 25 which are formed in the plate 5 are also formed in the plates 4a and 5a. This differs from the plate 4, the outer periphery of which is continuously circular and is provided with bolt holes 26 in alignment with the center line of the corresponding scallops.

The springing elements are now ready for assembly in a wheel. The assembly is illustrated in Fig. 4 in which 14 indicates a wheel hub having a plate 15 radiating outwardly therefrom and fixed thereto. A second plate 16 is bolted to the end of the hubs 14 and 17 and radiates from the axis of the hub 14, thus being parallel to the plate 15. The tire or tread surface 18 has a plate 19 radiating inwardly therefrom and residing between the plates 15 and 16. The plate 19 has a central opening 20 therethrough substantially larger than the outside diameter of the hub to permit relative movement therebetween. Between the tire 19 and the opening 20 are openings 21 through which assembly bolts 22 pass, these openings being substantially larger than the diameter of the bolts to permit relative movement therebetween.

In making the wheel assembly the springing element as shown in Fig. 3A is illustrated. It is placed against the plate 15, the bolts 22 then screwed into the plate 15 with their shoulders 23 pressing the plate 4 firmly against the plate 15. The plate 19 which has dowel holes is then placed against the doweled side of the springing element. Another similar springing element is then placed against the plate 19 with its dowels 10 fitting into the dowel holes in the plate. The openings 26 in the disc 4 receive the threaded outer ends of the bolts 22, the bolts each being provided with an enlarged shoulder 24. The shoulders 23 and 24 act as spacers. The outer plate 16 is then placed against the plate 4 and nuts 25' threaded on the outer ends of the bolts 22. The bolts 22 thus act as dowels to prevent relative sliding movement between the plate 16 and the disc 12.

Where the element illustrated in Fig. 3B is used the outer plates 15 and 16 will also be provided with dowel holes similar to those dowel holes found in the plate 19. It is also feasible, in the same wheel, to use one element as illustrated in Fig. 3A and the other as shown in Fig. 3B.

Various changes will occur to those skilled in the art and I desire to be extended protection within the scope of the appended claims.

What I claim is:

1. As an article of manufacture, a springing element for a resilient wheel composed of three side by side metallic discs each having a central opening therethrough, the outer discs being adapted for direct attachment to the hub and rail contacting member respectively of the wheel having identical inside, outside diameters and the inner disc being adapted to float between said outer discs and having a larger outside and a smaller inside diameter than said outer discs, and a mass of rubber-like material equal in inside and outside diameters respectively to the outer metallic discs separating the inside disk from each of said outside discs.

2. As an article of manufacture, a springing element for a resilient wheel composed of three side by side metallic discs each having a central opening therethrough, the outer discs having identical inside and outside diameters and the inner disc having a larger outside and a smaller inside diameter, and a mass of rubber-like material separating the inner plate from each of the two outer plates, the inside and outside diameter of both masses of rubber-like material being equal to the inside and outside diameters respectively of the outer metallic discs, at least one outside disc having hollow dowels projecting from the outside surfaces thereof.

3. As an article of manufacture, a springing element for a resilient wheel composed of three side by side metallic discs each having a central opening therethrough, the outer discs being adapted for direct attachment to the hub and rail contacting member respectively of the wheel having identical inside and outside diameters, the inner disc being adapted to float between said outer discs and having a larger outside and a smaller inside diameter than said outer discs and a mass of rubber-like material separating the inner plate from each of the two outer plates the inside and outside diameter of both masses of rubber-like material being equal to the inside and outside diameters respectively of the outer metallic discs, said inner and one of the outside discs being scalloped at their outer peripheries said masses of rubber also being correspondingly scalloped.

4. As an article of manufacture, a springing element for a resilient wheel composed of three side by side metallic discs each having a central opening therethrough, the outer discs having identical inside and outside diameters and the inner disc having a larger outside and a smaller inside diameter, and a mass of rubber-like material separating the inner plate from each of the two outer plates, the inside and outside diameter of both masses of rubber-like material being equal to the inside and outside diameters respectively of the outer metallic discs, one outside disc and the inside disc each being scalloped at their outer peripheries, the remaining disc having a circular outside periphery and being pierced inwardly of its outer periphery at points opposite the scallops in the other two discs.

5. As an article of manufacture, a springing element for a resilient wheel composed of three side by side metallic discs each having a central opening therethrough the outer discs having identical inside and outside diameters and the inner disc having a larger outside and a smaller inside diameter, and a mass of rubber-like material separating the inner plate from each of the two outer plates, the inside and outside diameter of both masses of rubber-like material being equal to the inside and outside diameters respectively of the outer metallic discs, the inside disc and one outside disc being scalloped at their outer periphery, the other outside disc having a circular outer periphery, both of said masses of rubber-like material being scalloped to correspond to the scallops of said discs, said other outside discs being pierced to correspond to said scallops.

6. As an article of manufacture, a springing element for a resilient wheel composed of three side by side metallic discs each having a central opening therethrough the outer discs having identical inside and outside diameters and the inner disc having a larger outside and a smaller inside diameter, and a mass of rubber-like material separating the inner plate from each of the two outer plates, the inside and outside diameter of both masses of rubber-like material being equal to the inside and outside diameters respectively of the outer metallic discs, the inside disc and one outside disc being scalloped at their outer periphery, said outside disc having dowels projecting outwardly therefrom, the other outside disc having a circular outer periphery and being pierced at points aligned with the scallops of the other two discs, said other disc having an outside surface uninterrupted by dowels, said masses of rubber-like material being scalloped to correspond to said inside disc and the first named outside disc.

EMIL H. PIRON.

REFERENCES CITED

The following references are of record in the file of this patent:

UNITED STATES PATENTS

| Number | Name | Date |
| --- | --- | --- |
| 1,917,929 | Duffy | July 11, 1933 |
| 2,161,164 | Hirshfeld | June 6, 1939 |
| 2,167,633 | Burrows | Aug. 1, 1939 |
| 2,259,776 | Piron | Oct. 21, 1941 |
| 2,290,661 | Williams | July 21, 1942 |
| 2,335,222 | Storch | Nov. 23, 1943 |
| 2,390,290 | Beebe | Dec. 4, 1945 |

FOREIGN PATENTS

| Number | Country | Date |
| --- | --- | --- |
| 426,697 | France | July 12, 1911 |